(12) United States Patent
Yan et al.

(10) Patent No.: US 7,179,547 B2
(45) Date of Patent: Feb. 20, 2007

(54) HIGH ALUMINUM ZEOLITE COATINGS ON CORRODIBLE METAL SURFACES

(75) Inventors: Yushan Yan, Riverside, CA (US); Derek Beving, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 271 days.

(21) Appl. No.: 10/977,132

(22) Filed: Oct. 29, 2004

(65) Prior Publication Data

US 2006/0093806 A1 May 4, 2006

(51) Int. Cl.
- B32B 15/04 (2006.01)
- B01J 29/06 (2006.01)
- B01J 29/80 (2006.01)
- C01B 39/02 (2006.01)

(52) U.S. Cl. ........... 428/701; 428/304.4; 427/376.2
(58) Field of Classification Search ........... 428/304.4, 428/701; 427/376.2
See application file for complete search history.

(56) References Cited

U.S. PATENT DOCUMENTS

| | | | |
|---|---|---|---|
| 5,447,694 A * | 9/1995 | Swaroop et al. | 422/171 |
| 6,500,490 B1 | 12/2002 | Yan | |
| 6,521,198 B2 | 2/2003 | Yan et al. | |
| 6,573,131 B2 | 6/2003 | Yan et al. | |
| 6,630,696 B2 * | 10/2003 | Yan et al. | 257/200 |
| 6,849,568 B2 * | 2/2005 | Yan | 502/4 |
| 2004/0237780 A1* | 12/2004 | Ma et al. | 95/55 |

FOREIGN PATENT DOCUMENTS

JP 2005289735 A * 10/2005

OTHER PUBLICATIONS

Muller et al., *Journal of Thermal Analysis*, 53:449-466 (1998).
Tather et al., *International Journal of Refrigeration*, 23:260-268 (2000).
Tather et al., *Microporous and Mesoporous Materials*, 34:23-30 (2000).
Tather et al., *Microporous and Mesoporous Materials*, 54:89-96 (2002).
Tather et al., *Porous Materials in Environmentally Friendly Processes, Studies in Surface Science and Catalysis*, 125:101-108 (1999).
Tather et al., *Microporous and Mesoporous Materials*, 28:195-203 (1999).
Wojcik et al., *Microporous and Mesoporous Materials*, 43:313-317 (2001).

* cited by examiner

Primary Examiner—Jennifer C. McNeil
Assistant Examiner—Aaron Austin
(74) Attorney, Agent, or Firm—Townsend and Townsend and Crew, LLP

(57) ABSTRACT

A composition of matter including a substrate of a metal that is susceptible to corrosion in a high pH alkaline solution, a corrosion-resistant base layer disposed on the surface of the substrate, the base layer having a pure or high silica zeolite having a silicon:aluminum atomic ratio of at least about 100, a middle mixed zeolite layer disposed on the surface of the base layer, and a top hydrophilic layer disposed on the surface of the middle layer, the top layer having a high aluminum zeolite having a silicon:aluminum atomic ratio of less than 5. The middle mixed zeolite layer includes a zeolite having a silicon:aluminum atomic ratio range that is between the silicon:aluminum ratio of the pure or high silica zeolite of the base layer and of the high aluminum zeolite of the top layer.

21 Claims, 15 Drawing Sheets

HIGH ALUMINUM ZEOLITE COATINGS ON CORRODIBLE METAL SURFACES

BACKGROUND OF THE INVENTION

The present invention relates in general to methods for creation of porous coatings and the treating of metal surfaces using the coatings to render them effective for adsorption applications. In particular, the present invention provides methods for making high aluminum zeolite coatings on aluminum and aluminum alloys.

High aluminum zeolite coatings on metals in general, and on aluminum and aluminum alloys in particular are useful for adsorption applications, such as in air conditioning and air separation devices. It is known that high conductivity metals, such as aluminum and aluminum alloys are preferred as heat exchanger parts (e.g., hot coils and chilled coils, and fins) in an air conditioning system. One way of improving the performance of an air conditioning device is to increase the heat transfer efficiency for both the cooling coil and heat rejection coil by coating the heat exchanging surfaces (i.e., aluminum or aluminum alloys) with a coating that can selectively adsorb moisture from air. It is generally known that high aluminum zeolites including X, Y, A and many others are useful as adsorbents for moisture adsorption.

In addition to enhancing the efficiency of air conditioning applications, zeolite coatings may also be used in space applications for removing contaminants and for producing oxygen enriched air. For these applications as well as many others, aluminum or aluminum alloy substrates are preferred for their better thermal conductivity and lighter weight. Likewise, for these applications, high aluminum zeolites are preferred for their better adsorption properties.

Zeolite coatings can be deposited on aluminum and aluminum alloys by wash or dip-coating method, a method widely used for preparing heterogeneous catalysts on monolithic supports (e.g., automotive 3-way exhaust catalysts). A typical wash-coating process consists of slurry preparation (i.e., zeolite particles and a proper binder), slurry application by washing or dipping, air knifing, drying, and sintering. The wash-coating method has several significant limitations. For example, for very small wavy fins (e.g., 28 fins/inch), excessively strong air knifing tends to leave some fin surfaces uncoated while weak air knifing leads to clogged fins. Once the wet coating is formed, it has to be dried and sintered at high temperatures (e.g., 300–600° C.) to establish binding among the coating components and adhesion between the coating and the fin surface. However, this high temperature treatment is highly undesirable because it often adversely affects the mechanical properties of the underlying alloys. Other drawbacks of the wash coating method include poor adhesion, clogging of zeolite pores by the binder reducing their adsorption capacity and the taking up of the valuable volume and weight budget of the system by the binder which does not contribute to adsorption capacity.

An alternative to wash-coating method is in situ crystallization or its derivatives (e.g., seeded growth) that deposit zeolite coatings directly onto the substrate from a synthesis solution. This is a low temperature process (e.g., <200° C.), uses no binder and offers excellent adhesion. Current zeolite coatings synthesized by in situ crystallization on aluminum and its alloys include pure silica (no aluminum) and high silica (low aluminum) zeolite coatings. As used herein, pure silica zeolites have a silicon:aluminum ratio of infinity, high silica zeolites have a silicon:aluminum ratio greater than 100 and high aluminum zeolites have a silicon:aluminum ratio less than 5. Pure or high silica zeolites are hydrophobic, or not significantly hydrophilic, whereas, their aluminosilicate counterparts are hydrophilic. The pH of the synthesis solutions for many of the pure and high silica types of coatings is mild or neutral, allowing a zeolite coating to form on the aluminum before corrosion occurs. High aluminum zeolite coatings such as zeolite X, zeolite Y and zeolite A are characterized by high pH synthesis solutions, which upon immersion of the aluminum substrate, begin to oxidize and possibly totally corrode the substrate before a zeolite coating can form thereon. To date, there have been no reported high-aluminum zeolite coatings on aluminum and its alloys.

BRIEF SUMMARY OF THE INVENTION

The present invention provides a method of making high-aluminum zeolite coatings for aluminum or aluminum alloy substrates, as well as other corrodible metal surfaces.

In one embodiment, the present invention provides a composition of matter. The composition of matter includes a substrate of a metal that is susceptible to corrosion in a high pH alkaline solution, a corrosion-resistant base layer disposed on the surface of the substrate, the base layer having a pure or high silica zeolite having a silicon:aluminum atomic ratio of at least about 100, a middle mixed zeolite layer disposed on the surface of the base layer, and a top hydrophilic layer disposed on the surface of the middle layer, the top layer having a high aluminum zeolite having a silicon:aluminum atomic ratio of less than 5. The middle mixed zeolite layer includes a zeolite having a silicon:aluminum atomic ratio range that is between the silicon:aluminum ratio of the pure or high silica zeolite of the base layer and of the high aluminum zeolite of the top layer.

In another embodiment, the present invention provides a process for applying a corrosion-resistant and a hydrophilic coating to the surface of a metal substrate that is susceptible to corrosion in a high pH alkaline solution. The process includes forming a base corrosion-resistant layer on the surface of the substrate, the base layer including a pure or high silica zeolite having a silicon:aluminum atomic ratio of at least about 100, forming a middle mixed zeolite layer on the surface of the base layer; and forming a top hydrophilic layer on the surface of the middle layer, the top layer including a high aluminum zeolite having a silicon:aluminum atomic ratio of less than 5. The middle mixed zeolite layer has a zeolite having a silicon:aluminum atomic ratio range that is between the silicon:aluminum ratio of the pure or high silica zeolite of the base layer and of the high aluminum zeolite of the top layer.

For a fuller understanding of the nature and advantages of the embodiments of the present invention, reference should be made to the following detailed description taken in conjunction with the accompanying drawings.

DETAILED DESCRIPTION OF THE INVENTION

Figure 1:
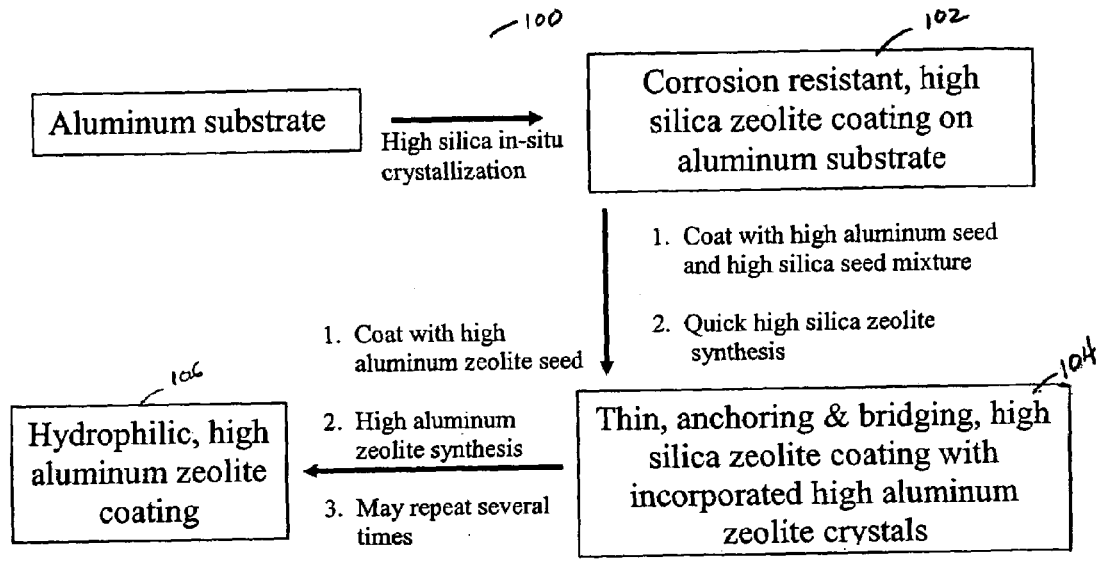
FIG. 1 is a block diagram of the three-layer (base, middle, top) synthesis process for generating high aluminum coatings on aluminum substrates in accordance with one embodiment of the present invention.

The present invention provides a method of making high-aluminum zeolite coatings for aluminum or aluminum alloy substrates, as well as other corrodible metals.

The embodiments of the present invention are directed towards generating high aluminum zeolite coatings on aluminum and its alloys. As used herein, a high aluminum zeolite is one where the zeolite has a silicon:aluminum ratio range of less than 5. The embodiments of the present invention describe such coatings and their application process. In accordance with the embodiments of the present invention, the coated aluminum or aluminum alloy substrate has three layers (base, middle and top), each layer having a distinct synthesis process. Many zeolite molecular sieve compositions could be used for each of the layers. Preferably, the base zeolite layer, directly in contact with the aluminum substrate, is of pure or high silica zeolite such as Silicalite-1 or ZSM-5. The preferred method for the formation of the base layer is a one-step in-situ crystallization at low temperature using synthesis solutions of mild or neutral pH. Pure or high silica zeolites have higher chemical, thermal and mechanical stability than their high aluminum counterparts. The high silica zeolite base layer confers corrosion protection to the aluminum substrate that will be helpful in protecting the aluminum in the severely corrosive synthesis solution of high aluminum zeolites.

The middle zeolite layer is formed by seeded growth. The high silica zeolite (base layer) coated substrate is seeded either with a mixture of high silica and high aluminum zeolite crystals or entirely with high aluminum zeolite crystals followed by a short synthesis in a high silica zeolite synthesis solution. The middle layer provides an anchoring bridge between the high silica (base) coating and the high aluminum (top) coating. The middle layer is characterized by a mixed zeolite (i.e., a mixture of pure or high-silica zeolite and high aluminum zeolite) coating having a silicon: aluminum atomic ratio range that is between the silicon: aluminum ratio of the pure or high silica zeolite of the base layer and of the high aluminum zeolite of the top layer.

In one embodiment, the top layer is formed by seeded growth. The two-layer zeolite coated substrate described above is seeded with high aluminum zeolite crystals followed by a short synthesis in a high aluminum synthesis solution. The synthesis of this top layer may be repeated several times to achieve a desired thickness. The top layer is characterized by a zeolite that has a silicon:aluminum ratio approximately in the 1 to 5 range.

The embodiments of the present invention are useful for generating hydrophilic, high aluminum zeolite coatings on aluminum and its alloys. Zeolites, especially pure and high silica zeolites are known for their thermal and chemical stability and mechanical strength. Several high silica zeolite coatings such as ZSM-5 are corrosion resistant and have superior performance to chromate conversion and anodization coatings. These corrosion resistant zeolite coatings can be universally applied to many metal types. The metals demonstrated have included steel, aluminum, and aluminum alloys, including the 2000, 5000, 6000, and 7000 series aluminum alloys. The coating process is in-situ crystallization, which is capable of coating surfaces of complex shape and in confined spaces. Once synthesized the high silica zeolite coatings afford corrosive protection of the coated substrate in strongly corrosive media, including extremely acidic and basic environments.

The crystalline structure of the high silica (i.e., the base layer) and high aluminum zeolites (i.e., the top layer) are vastly different. To ensure strong adhesion between the two different coating types a mixed zeolite layer consisting of both types of zeolites is formed. This middle layer serves as an anchoring bridge between the two types of zeolite coatings. The high silica zeolite coated aluminum substrate is coated with either a mixture of high silica and high aluminum zeolite seed crystals or solely with high aluminum zeolite seed crystals. Many seeding permutations may be used. In one arrangement, the seed layer is a mixture of the two seed types with the high aluminum seed making up at least 50% of the seed mixture. The mixed seed layer undergoes a short, (e.g., one-hour) synthesis in high silica zeolite synthesis solution. The short synthesis ensures that the high aluminum zeolite crystals are anchored and the high silica layer is thin so as to leave exposed the high aluminum zeolite crystals. As used herein, a short synthesis is a time significantly less than the time required for the high silica base layer and a thin layer refers to the thickness of the high silica component of the mixed zeolite middle layer. Longer synthesis times would result in the high silica zeolite component masking the high aluminum zeolite seed crystals present in the layer.

As described above, the top layer is a high aluminum zeolite layer. Such zeolite coatings include zeolite X, zeolite Y, zeolite A, and others. In one embodiment, the top layer's coating process is also a seeded growth. Substrates with the middle and base (i.e., two layer coating structure) zeolite layers are initially seeded with nanometer-sized or micrometer-sized high aluminum zeolite crystals followed by synthesis in a high aluminum zeolite synthesis solution. The top layer synthesis is repeated several (e.g., three) times to optimize coating thickness.

FIG. 1 is a block diagram 100 that illustrates the three three-layer (base, middle and top) coating process and the three different zeolite layers. As is shown in FIG. 1, the process for forming a high aluminum zeolite coating on an aluminum or aluminum alloy substrate involves the formation of three different zeolite layers (base, middle and top). First (step 102), the aluminum substrate is coated with a corrosion resistant, high silica zeolite (base) using in-situ crystallization techniques. Next (step 104), the substrate is coated with a thin anchoring and bridging middle layer of high silica zeolite coating with incorporated high aluminum zeolite crystals. This middle anchoring and bridging layer is formed by a two step process, where in the first step the substrate is coated with either a mixture of high aluminum zeolite seed and high silica zeolite seed or all high aluminum zeolite seed and in the second step, the covered substrate undergoes a short high silica zeolite synthesis. As used herein a short synthesis refers to a time significantly less than the time required for the high silica base layer. Next (step 106), the two-layer (base and middle) coated substrate is coated with a high aluminum zeolite coating, which is formed by coating the substrate with a high aluminum zeolite seed and then synthesizing the high aluminum zeolite. By using the method described above, an aluminum or aluminum alloy substrate is coated with a high aluminum zeolite coating as is further described below in conjunction with FIG. 2.

Figure 2:
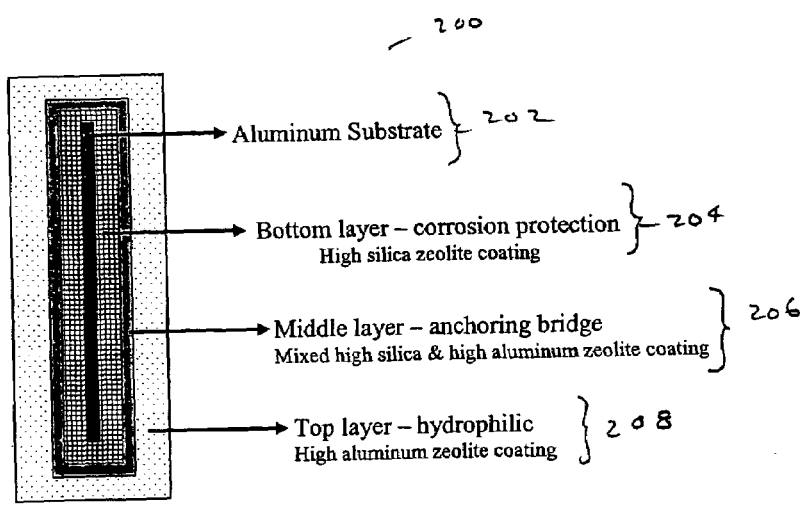
FIG. 2 is an exemplary diagram of the three-zeolite layers synthesized on an aluminum substrate in accordance with one embodiment of the present invention.

FIG. 2 is an exemplary diagram 200 of the three-zeolite layers synthesized on an aluminum substrate in accordance with one embodiment of the present invention. FIG. 2 shows the aluminum substrate 202 covered by the base zeolite layer 204, then a middle zeolite layer 206 and a top zeolite layer 208. The base layer 204, which is a high silica zeolite coating, provides corrosion protection. The top layer 208, which is a high aluminum zeolite, provides adsorption capacity and the middle layer 206, which is a mixture of high silica and high aluminum zeolite coating provides for a bridging layer between the bottom and the top layer to ensure an effective anchoring of the bottom layer to the top layer.

Based on the techniques described above, the inventors herein have successfully generated high aluminum zeolite coatings on aluminum and its alloys. In one embodiment, the base layer in contact with the substrate was a ZSM-5, high silica zeolite, coating. In addition to the ZSM-5 high silica zeolite, any high or pure silica coating that confers corrosion resistance to aluminum and its alloys should function well as a base layer protecting the aluminum substrate from corrosion during high aluminum zeolite synthesis. The middle layer was generated through a seeded growth using mixed seed. Several applications of nanometer-sized or micrometer-sized zeolite seed crystals were carried out on the ZSM-5 (base layer) coated aluminum substrate. The first layer of seed was either zeolite Y, Silicalite-1 or a mixture of the two seed types. This layer was applied one to two times. The top most seed layer was a mixture of the two seed types with the high aluminum zeolite seed making up approximately 50–70 percent of the mix. The base and top coating layers determine the seed types used in seeding the middle layer. It is preferred to use the same zeolite type seeds as used in the adjacent coatings to ensure strong adhesion between the middle layer and the adjacent layers. The seeded layer is grown into a coating by a short synthesis in the high-silica, base layer synthesis solution. It is preferred that this coating is thin so as not to mask the high aluminum crystals present throughout the seeded layer. The exposed high aluminum zeolite seed crystals will aid in the strong adhesion of the high aluminum zeolite top layer with the middle layer. The middle layer serves as an anchor and bridge between the base and top layers, and ensures a strong adherence between disparate zeolite coatings. Having formed the middle layer, the high aluminum coating, (for example, zeolite Y) was formed by seeded growth. Synthesis of the top high aluminum zeolite coating may be repeated several times to increase the thickness of the high aluminum coating.

In addition to the embodiments described above for forming high aluminum zeolite coatings on aluminum and aluminum alloy substrates, the following alternate embodiments may also be used to form high aluminum zeolite coatings on an aluminum, aluminum alloy, and other corrodible metal substrates.

In a first alternative embodiment, as an alternative to seeded growth, the top (the high aluminum zeolite) layer may be formed by an in-situ crystallization process. The inventors herein have successfully generated a high aluminum zeolite, zeolite A, coating on ZSM-5 coated stainless steel, SS304, by in-situ crystallization.

A second alternative method of synthesizing the high aluminum top layer involves the addition of pre-formed nanometer-sized high-aluminum zeolite seed crystals to the high aluminum synthesis solution (i.e., not on the base layer ZSM-5 coating). The inventors herein have successfully generated zeolite Y, high aluminum coatings on aluminum alloys by pre-seeding the zeolite Y synthesis solution with nanometer-sized crystals of zeolite Y.

The embodiments of the present invention enable the treatment of any metal surface, that is otherwise susceptible to corrosion upon exposure to a highly acidic or alkaline solution, to render it effective for adsorption of water and other molecules. Exemplary metals include ferrous metals, aluminum-containing metals, aluminum alloys and aluminum. The following additional examples are offered for purposes of illustration, and are not intended to limit the invention.

DETAILED EXAMPLES

The following detailed examples describe the process of forming the high aluminum zeolite coatings on aluminum metals and alloys. As described above, the coated metal substrate includes a base layer, an intermediate or a bridging middle layer and a top layer.

Base Layer: In Situ Crystallization

The base layer is a high silica zeolite coating for corrosion protection and for the protection of the substrate from high alkaline zeolite Y synthesis solutions during later synthesis steps. In this example a ZSM-5 coating was used, however any high-silica-zeolite or pure-silica-zeolite coating may also be used.

Figure 3:
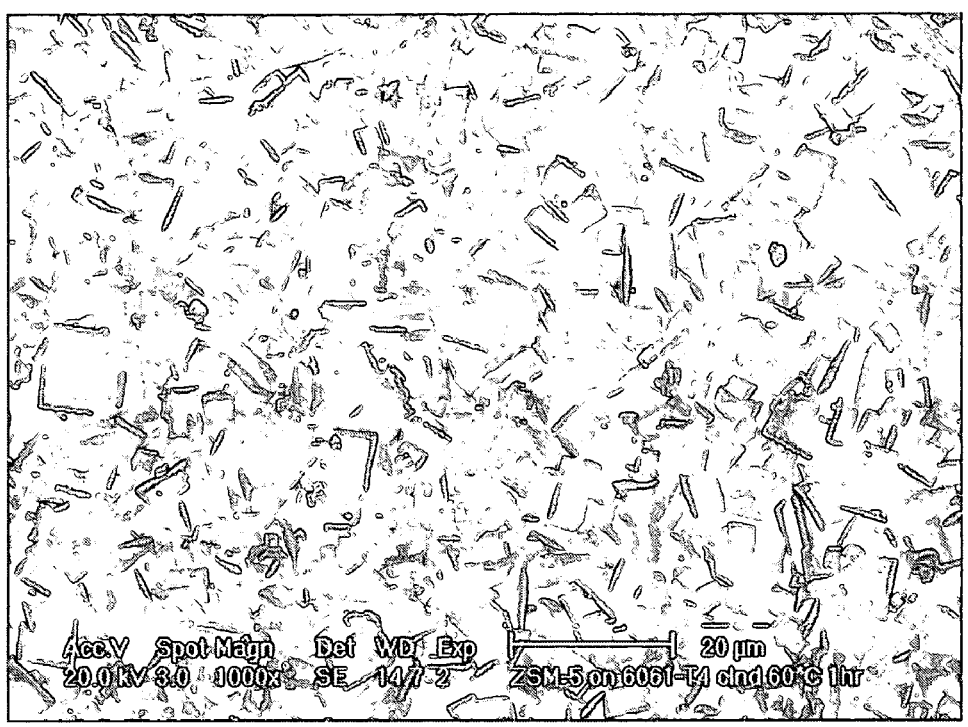
FIG. 3 is a SEM micrograph of ZSM-5 on aluminum alloy (AA) 6061-T4.
Figure 4:
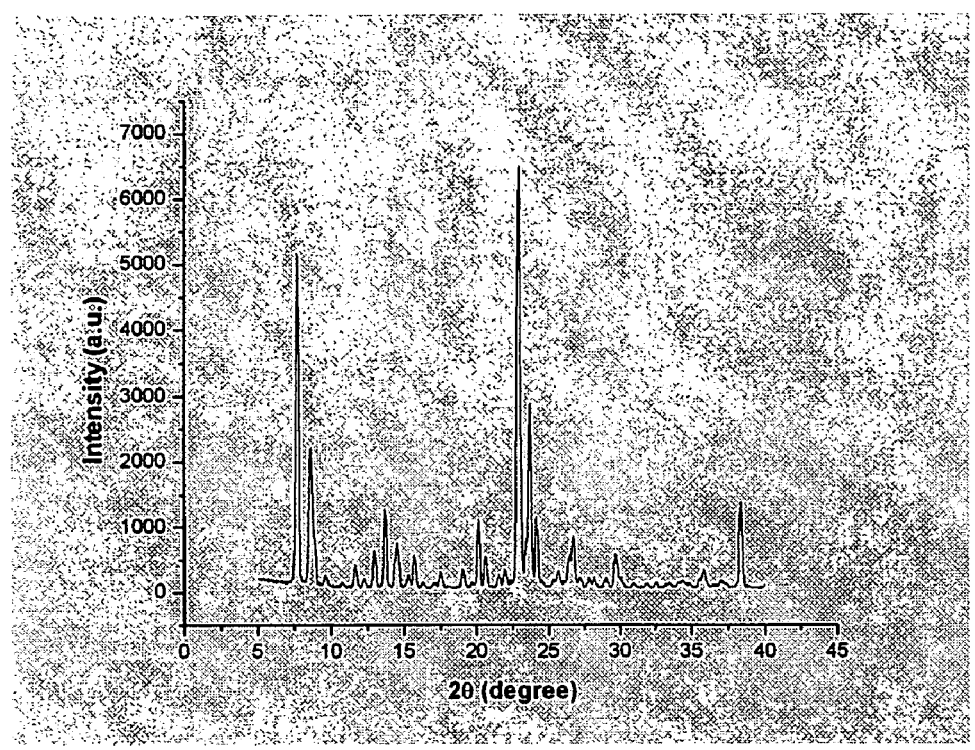
FIG. 4 is an XRD pattern of ZSM-5 on AA 5052-H32.
Figure 5:
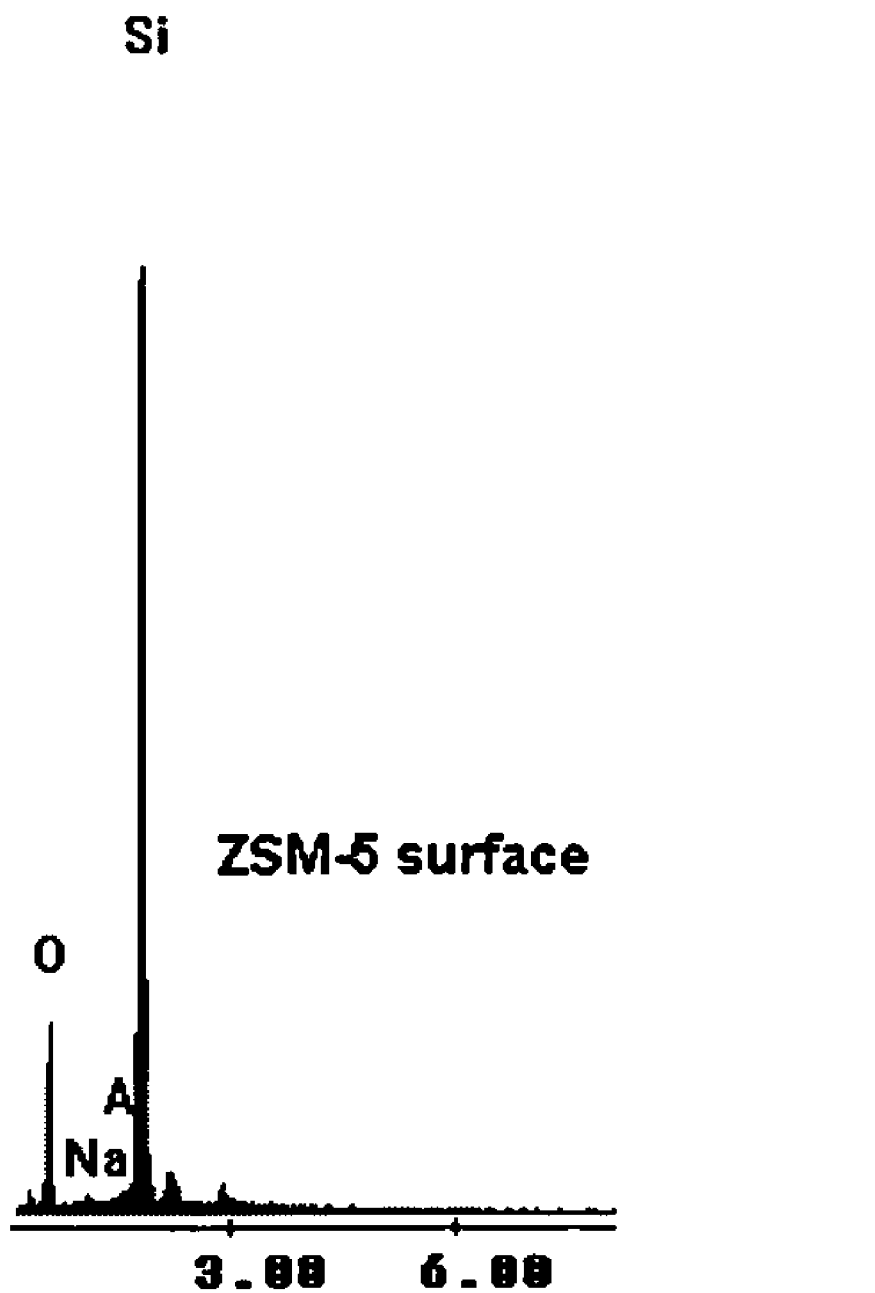
FIG. 5 is an EDaX pattern of surface ZSM-5 on AA 5053-H2.

Zeolite ZSM-5 coatings were prepared by in-situ hydrothermal crystallization methods. First, a clear synthesis solution with molar composition $0.16TPAOH:0.64NaOH:TEOS:92H_2O:0.0018Al$ (gram composition, 8.515 gTPAOH (40 wt % aqueous solution), 2.68 gNaOH, 21.8 gTEOS, 168.04 gH$_2$O, 0.00532 gAl) was obtained by dissolving aluminum powder (200 mesh, 99.95+wt %, Aldrich) in sodium hydroxide (99.99 wt %, Aldrich) and double de-ionized water followed by drop wise addition of tetraproylammonium hydroxide (TPAOH, 40 wt %, aqueous solution, SACHEM) and tetraethylorthosilicate (TEOS, 98 wt %, Aldrich) under stirring. The clear solution was aged at room temperature for about 4 h under stirring before use. The substrates used in the examples included aluminum alloys commonly used in the aerospace and shipping industries, A1-2024-T3, 5052-H32, 6061-T4, and 7075-T6. The substrates were sized to 2 cm×3.5 cm and cleaned at 60° C. for 1 h in an Alconox detergent solution (3.0 grams Alconox in 400 ml de-ionized H$_2$O). The substrates were then rinsed under DI H$_2$O with mild rubbing. Substrates were dried with compressed air and kept at ambient conditions <1 h before immersion in ZSM-5 synthesis solution. A Teflon-lined Parr autoclave was used as the synthesis vessel and the substrates were fixed vertically inside the synthesis solution using Teflon holders. Crystallization was carried out in a convection oven at 175° C. for 16 h. The autoclave was then removed and quenched with tap water. The coated samples were water rinsed and dried in ambient room air for 12 h before characterization. FIG. 3 shows a SEM micrograph of ZSM-5 formed on aluminum alloy 6061-T4. FIG. 4 is an X-ray diffraction ("XRD") pattern of ZSM-5 on aluminum alloy 5052-H32. FIG. 5 is an energy dispersive analysis of X-ray ("EDaX") pattern of surface ZSM-5 on aluminum alloy 5052-H32. The results summarized in FIGS. 3-5 show and characterize the successful formation of ZSM-5 or a high-silica-zeolite or pure-silica-zeolite coating on various aluminum alloys.

Middle Layer: Seeded Growth

This example describes the formation of the zeolite Y ("ZY") seed followed by a ZSM-5 synthesis on a ZSM-5 coated aluminum alloy ("AA"). The resulting structure, from the outside down to the metal surface is designated herein as a ZSM-5 (4.5 h)/ZY seed/ZSM-5-AA layer stack. The formation of the middle layer includes the application of zeolite Y seed on the ZSM-5 coated aluminum alloy followed by a short ZSM-5 synthesis (4.5 h). The method of synthesis for this middle layer shows great utility for the generation of many types of zeolite coatings. The ZSM-5 coated aluminum alloy is seeded with any zeolite seed or crystal type followed by a short ZSM-5 synthesis to "glue" the seeds together and adhere them to the ZSM-5 base. The thickness of this layer can be controlled by the thickness of the seed layer and by repeated seeding and synthesis. The resultant coating is a mixture of the seed zeolite and the cementing zeolite.

ZY seed synthesis [e.g., see Katsuki H, Furuta S, Komarneni S. 2001. Microwave versus conventional-hydrothermal synthesis of NaY zeolite. *Journal of Porous Materials,* 8: 5–12. "Katsuki H, et. al., 2001"]. NaY zeolite crystals were synthesized by a modified method of Katsuki H, et. al., 2001. A milky synthesis solution with molar composition 10SiO$_2$:1Al$_2$O$_3$:14Na$_2$O:800H$_2$O (gram composition, 30.82 g Ludox LS30, 0.8308 g Al, 17.23 g NaOH, 197.26 g H$_2$O) was obtained by dissolving aluminum powder (200 mesh, 99.95+wt %, Aldrich) in sodium hydroxide (99.99 wt %, Aldrich) and double de-ionized water. Ludox® LS30 colloidal silica (30 wt. %, silica, Aldrich) was added drop wise to the stirring solution. The solution was aged at room temperature for greater than 8 h under stirring before use. 25 ml of the aged solution was treated at 120° and 100° C. in Teflon vessels using a microwave synthesis system (MARS 5, Model XP-1500, CEM Corp., Matthews, N.C.). The temperature was ramped from room temperature to 120° C. in 90 sec and held at this temperature for 30 sec. The synthesis temperature was allowed to cool naturally to 100° C. and held at this temperature for 2 h. After hydrothermal treatment, samples were centrifuged at 3000 rpm for 15 min and the solids were washed several times with double deionized water to remove excess NaOH. The washed samples were re-suspended in ethanol at various wt % concentrations.

Figure 6:
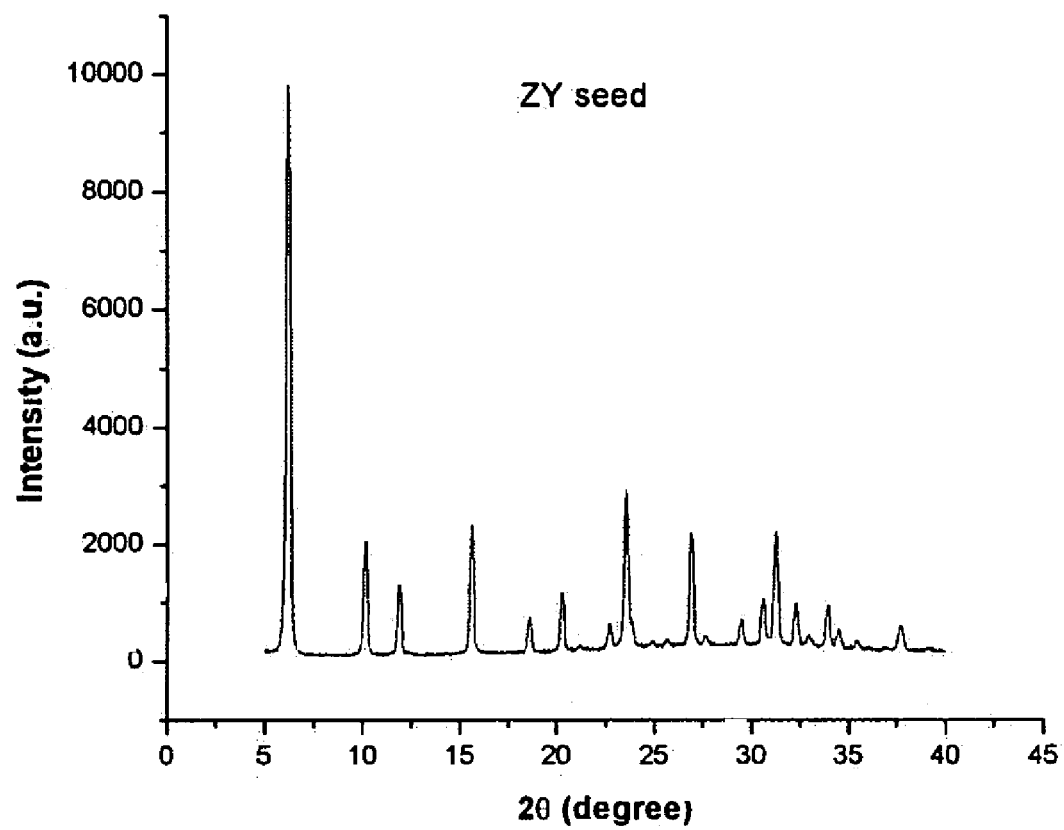
FIG. 6 is an XRD pattern of zeolite Y seed.
Figure 7:
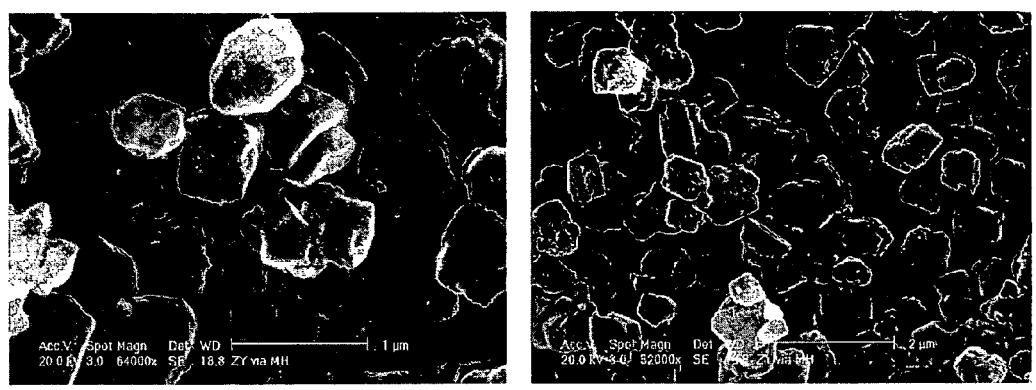
FIG. 7 shows SEM micrographs of zeolite Y seed.

ZY seed characterization. The XRD patterns were obtained on a Siemens D-500 diffractometer using Cu K$_\alpha$ radiation and provided in FIG. 6. The ZY seed particle size of ~850 nm was determined by Scanning Electron Microscope (SEM) (Philips XL30-FEG operated at 20 kV), as shown in FIG. 7. The ZY seed size is not critical, and seeding has also been achieved using nanometer-sized (~30 nm) and large (~2 um) seed particles.

Figure 8:
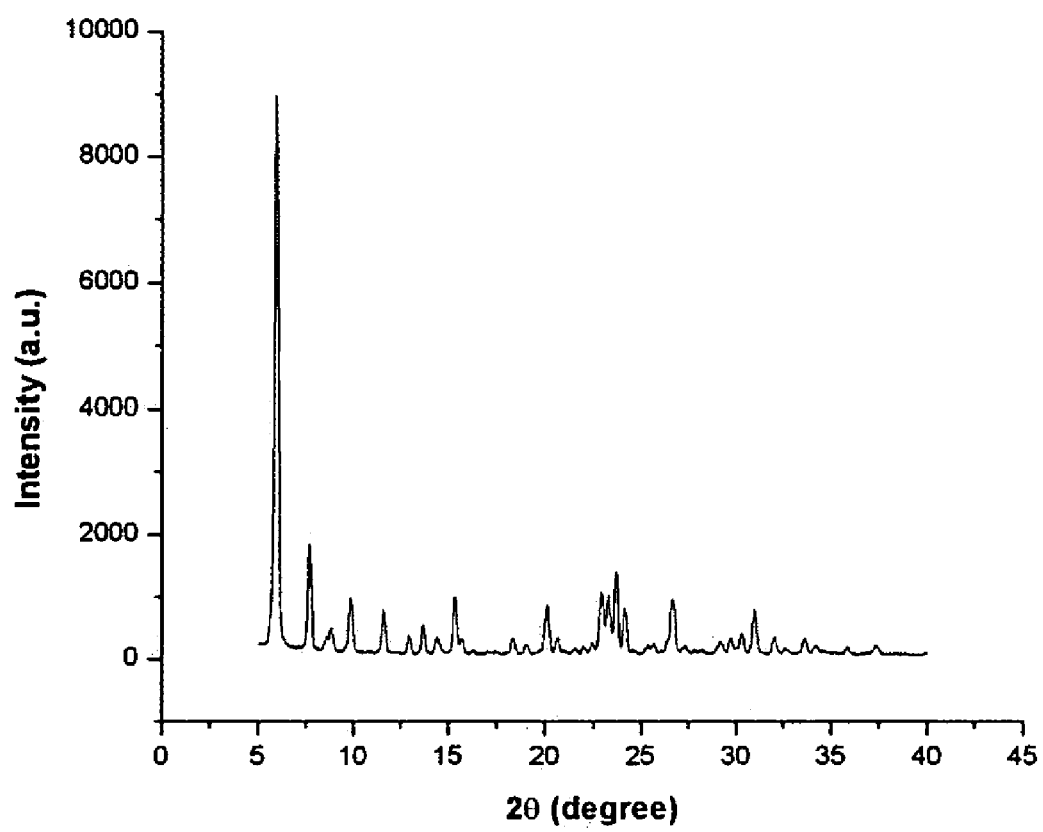
FIG. 8 is an XRD pattern of zeolite Y seeded ZSM-5-AA. Peaks from both ZSM-5 and zeolite Y are present.

ZY seeding method. The ZSM-5 coated aluminum alloy was dipped twice in a 1.0 wt % aqueous solution of either hydroxylpropyl cellulose (HPC) (Avg. Mw=100,000, Aldrich) or Compozil (Avg Mw=120,000, Eka Chemicals, Marietta, Ga.) at a pH of 8.0. The concentration of these solutions can be varied from 1.0 wt. %. The function of these solutions is to impart a positive charge on the surface of the sample to enhance seed binding. However, it should be noted that a positively charged solution is not a requirement. The ZSM-5 coated aluminum alloys were submersed in the solution for two minutes, removed and air dried at room temperature and then dipped again in the solution for two minutes and air dried. The samples were then immersed in ZY seed suspension in ethanol with 10–25% of suspended zeolite for two minutes, air dried, followed by heating at 60° C. for 15 min to ensure complete ethanol evaporation. The singly seeded samples were then immersed in the positive charged HPC or Compozil solution for 30 seconds and air dried at room temperature. The ZY seeding and immersion in the positive charged solution were repeated. FIG. 8 is an XRD pattern of ZY seeded ZSM-5-AA. This figure shows that peaks from both ZSM-5 and ZY are present.

Figure 9:
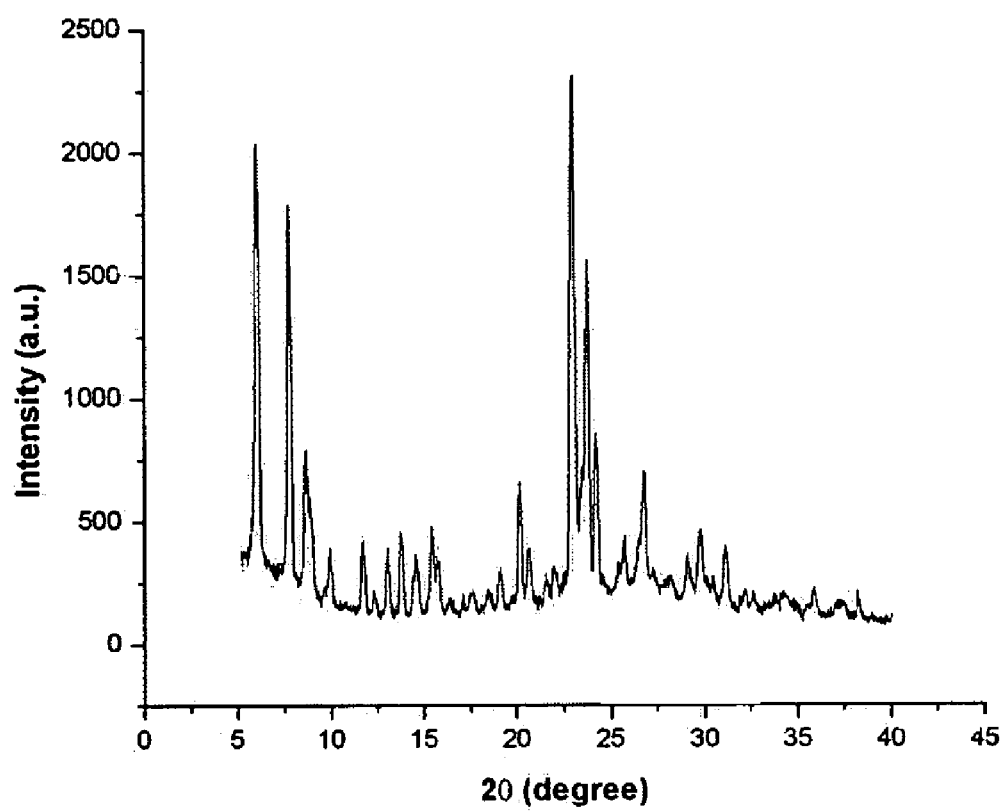
FIG. 9 is an XRD pattern of ZSM-5 (4.5 h)/zeolite Y seed/ZSM-5-AA stack. It shows that peaks from both ZSM-5 and zeolite Y are present.

ZSM-5 short synthesis. The same synthesis solution and methods as the ZSM-5 base layer were used. The variation is that the synthesis time is shorter at about 4.5 h. FIG. 9 shows an XRD pattern of ZSM-5 (4.5 h)/ZY seed/ZSM-5-AA stack. It shows that peaks from both ZSM-5 and ZY are present.

Figure 10:
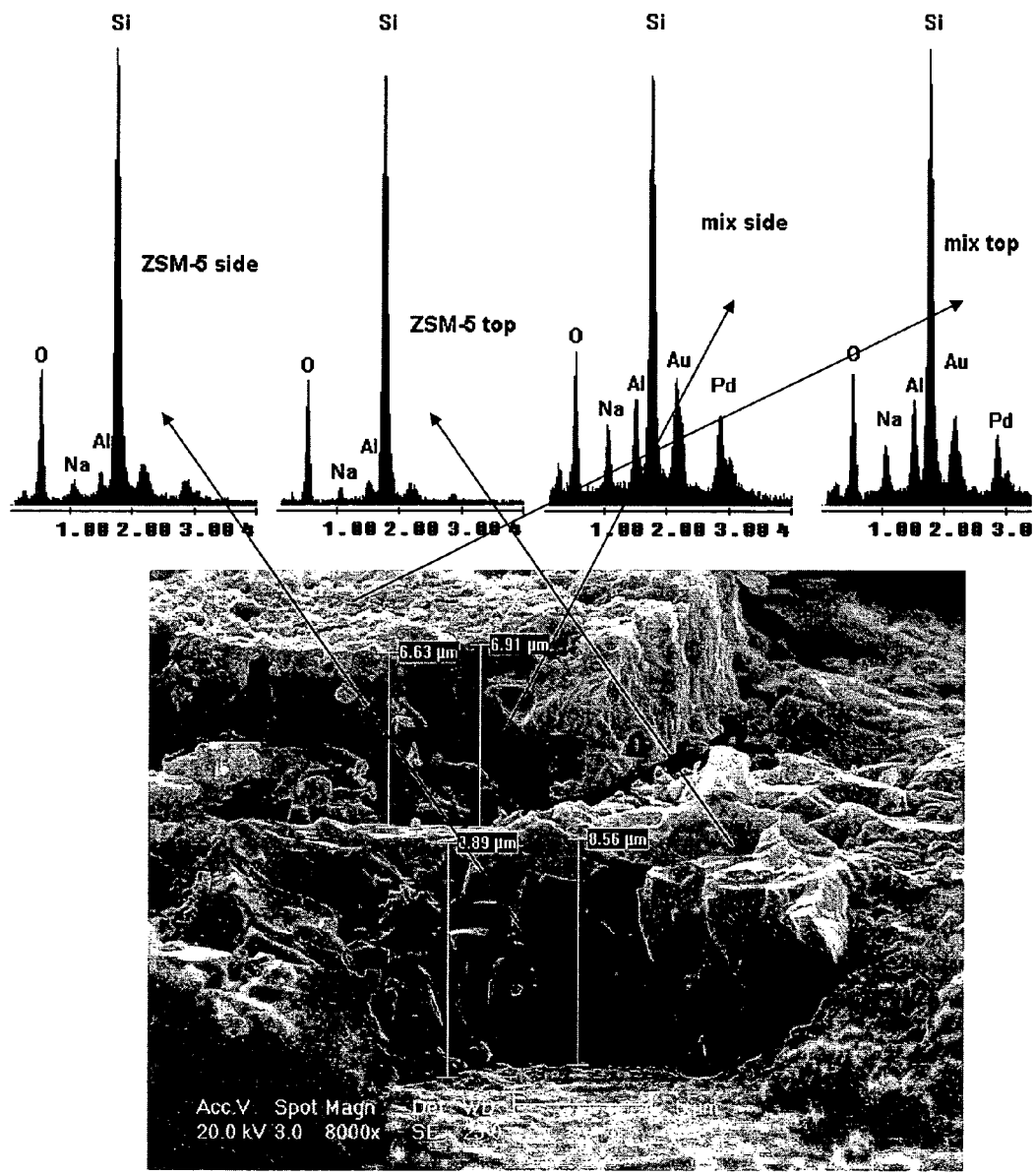
FIG. 10 is a SEM micrograph (thickness of ZSM-5 base layer and the zeolite Y seed layer after 4.5 h ZSM-5 synthesis) and EDaX patterns of top and side of the two layers. The 'mix side' and 'mix top' in the EDAX scans above refer to the mixed EDaX finger-print of Zeolite Y and ZSM-5.
Figure 11:
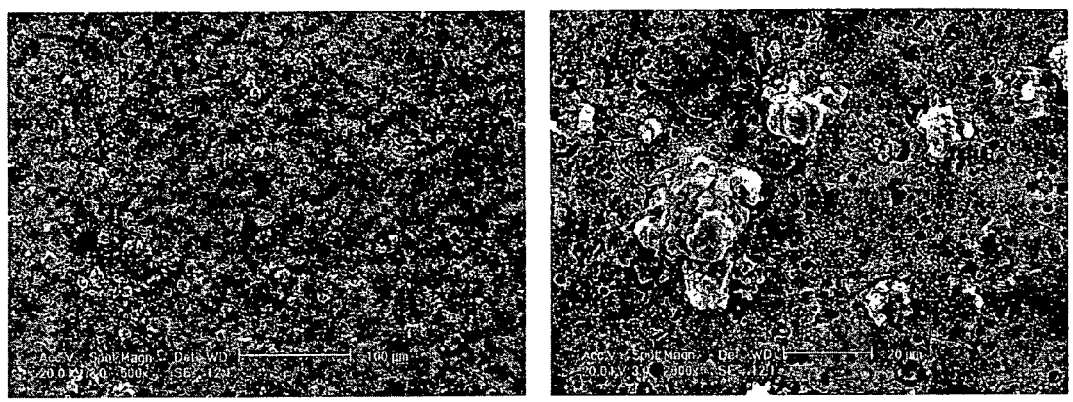
FIG. 11 shows SEM surface micrographs of ZSM-5 (4.5 h)/ZY seed/ZSM-5-AA.

FIG. 10 shows a SEM micrograph (thickness of ZSM-5 base layer and the ZY seed layer after 4.5 h ZSM-5 synthesis) and an EDaX pattern of top and side of the two layers. The 'mix side' and 'mix top' in the EDaX scans refer to the mixed EDaX finger-print of ZY and ZSM-5. The EDaX pattern of the ZY seed layer after ZSM-5 synthesis shows an enrichment in the Al and Na content, as compared to the ZSM-5 base layer, representing the ZY seed contribution to this layer. FIG. 11 shows SEM surface micrographs of ZSM-5 (4.5 h)/ZY seed/ZSM-5-AA. The micrographs from FIGS. 10 and 11 illustrate the integrity of this mixed zeolite layer.

Top Layer ZY Seeded Growth on ZSM-5 (4.5 h)/ZY Seed/ZSM-5-AA Substrate.

Figure 12:
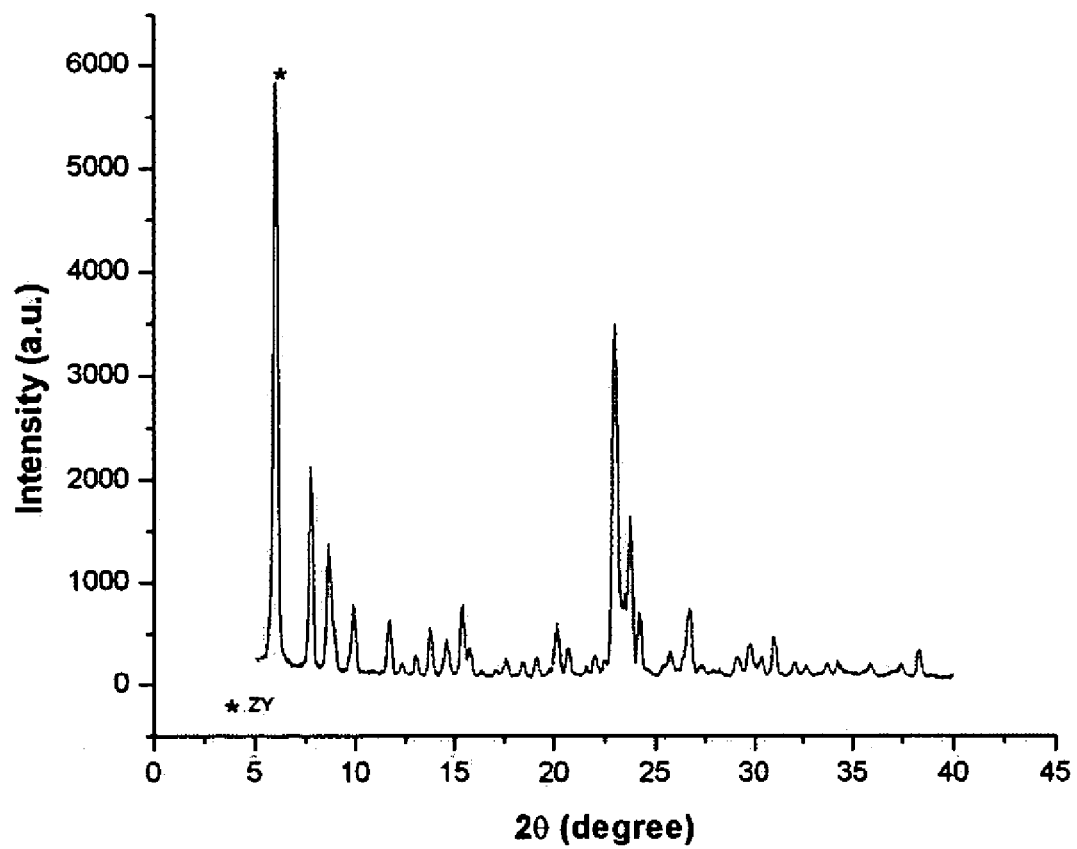
FIG. 12 is an XRD pattern of zeolite Y seeded ZSM-5 (4.5 h)/zeolite Y seed/ZSM-5-AA. It shows that peaks from both ZSM-5 and zeolite Y are present.

ZY seeding method. The ZSM-5 (4.5 h)/ZY seed/ZSM-5-AA samples were dipped twice in the positively charged HPC solution in the same manner as the ZSM-5-AA samples described above. The ZY seeding procedure was as before, alternating between immersion in ZY seed and positively charged cellulose solution. FIG. 12 shows an XRD pattern of ZY seeded ZSM-5 (4.5 h)/ZY seed/ZSM-5-AA. It shows that peaks from both MFI and ZY were present.

ZY seeded growth. The ZY seeded growth was performed via microwave heating to reduce sample contact time within highly alkaline synthesis solutions. There is a limited flexibility in the choice of synthesis solution used in ZY seeded growth. This limitation is due to a zeolite framework similarity between zeolites; NaA, NaY and NaX (e.g., see Kumakiri I, Yamaguchi T, Nakao S. 1999. Preparation of zeolite A and Faujasite membranes from a clear solution. *Ind. Eng. Chem. Res.* 38: 4682–4688). Kumakiri I, et. al. demonstrated that two different zeolite membranes can be formed from the same synthesis solution dependent upon the seed type used on the support. They formed dense membranes of pure zeolite NaA and pure zeolite NaY membranes using the same synthesis solution. Potentially, any synthesis solution used for the synthesis of NaA, NaY and NaX membranes could be used for the generation of membranes by seeded growth of each type of zeolite depending on what seed type the substrate is seeded with.

Figure 13:
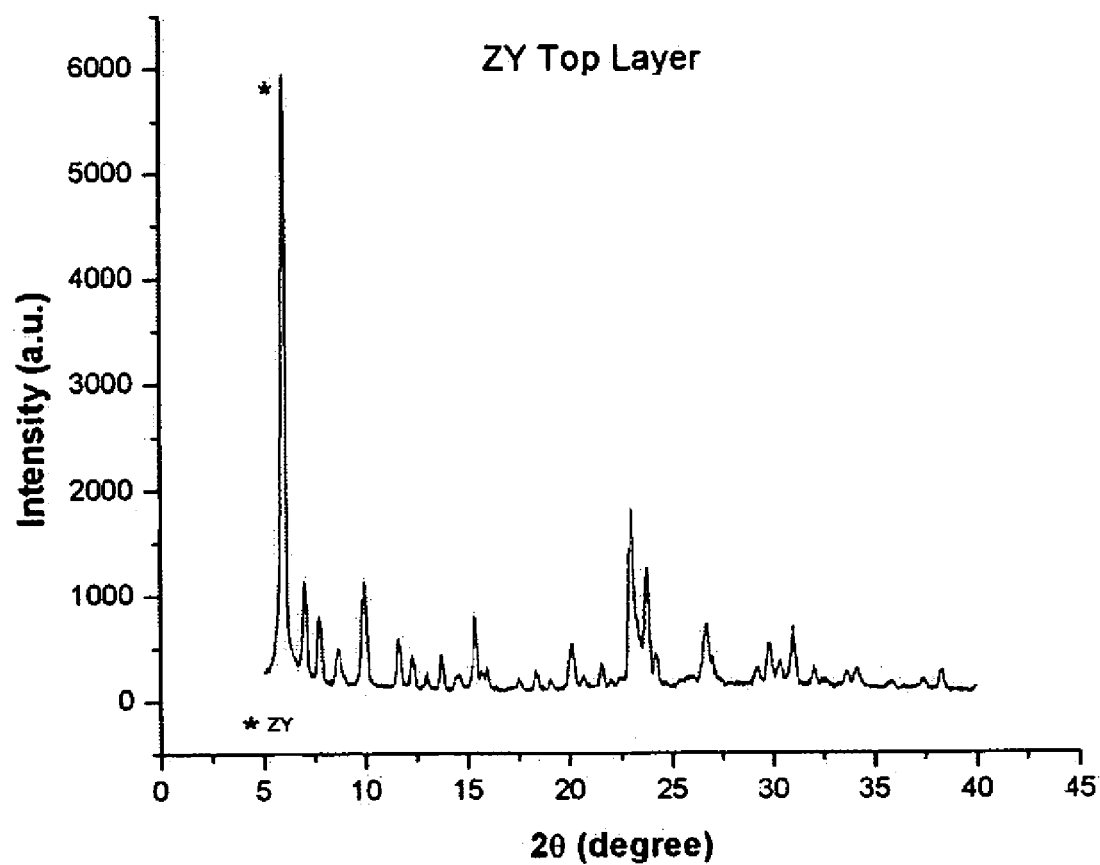
FIG. 13 is an XRD pattern of the zeolite Y top layer. Peaks from ZSM-5, zeolite Y and zeolite X are present with zeolite Y predominant.

The inventors herein have successfully synthesized a ZY coating by seeded growth using two different synthesis solutions modified from Cetin T., et. al. (e.g., see Cetin T, Tather M, Erdem-Senatalar A, Demirler U, Urgen M. 2001. Lower temperatures for the preparation of thinner zeolite A coatings. *Microporous and Mesoporous Materials*. 47: 1–14; and Kumakiri I., et. al.) Both synthesis solutions were clear with molar compositions of $10Na_2O: 0.2Al_2O_3: 1SiO_2: 200H_2O$ (gram composition, 32 g NaOH, 0.432 g Al, 8.0 g Ludox LS30, 133.2 g $H_2O$) and $80Na_2O: 1Al_2O_3: 9SiO_2: 5000H_2O$ (gram composition, 16 g NaOH, 0.135 g Al, 4.51 g Ludox LS30, 218.8 g $H_2O$), respectively. Clear synthesis solutions were obtained for both solutions by dissolving aluminum powder (200 mesh, 99.95+wt %, Aldrich) in sodium hydroxide (99.99 wt %, Aldrich) and double de-ionized water. Ludox® LS30 colloidal silica (30 wt. %, silica, Aldrich) was added drop wise to the stirring solution. The solutions were aged at room temperature for greater than 4 h (Cetin T, et. al. recipe) and greater than 15 h (Kumakiri I., et. al. recipe) under stirring before use. The seeded substrates were fixed vertically inside Teflon vessels using Teflon holders, immersed in 50 ml synthesis solution. Crystallization was carried out in a microwave synthesis system (MARS 5, Model XP-1500, CEM Corp., Matthews, N.C.). The temperature was ramped from room temperature to 80° C. in 90 sec and held at this temperature for 1 min. The synthesis temperature was allowed to cool naturally to 60° C. and held at this temperature for 1 h. The seeding and synthesis steps may be repeated multiple times to increase the thickness of the ZY top layer. ZY coatings synthesized from both synthesis solutions yield similar results with ZY being the predominant zeolite in the XRD signature, as is shown in FIG. 13.

Figure 14:
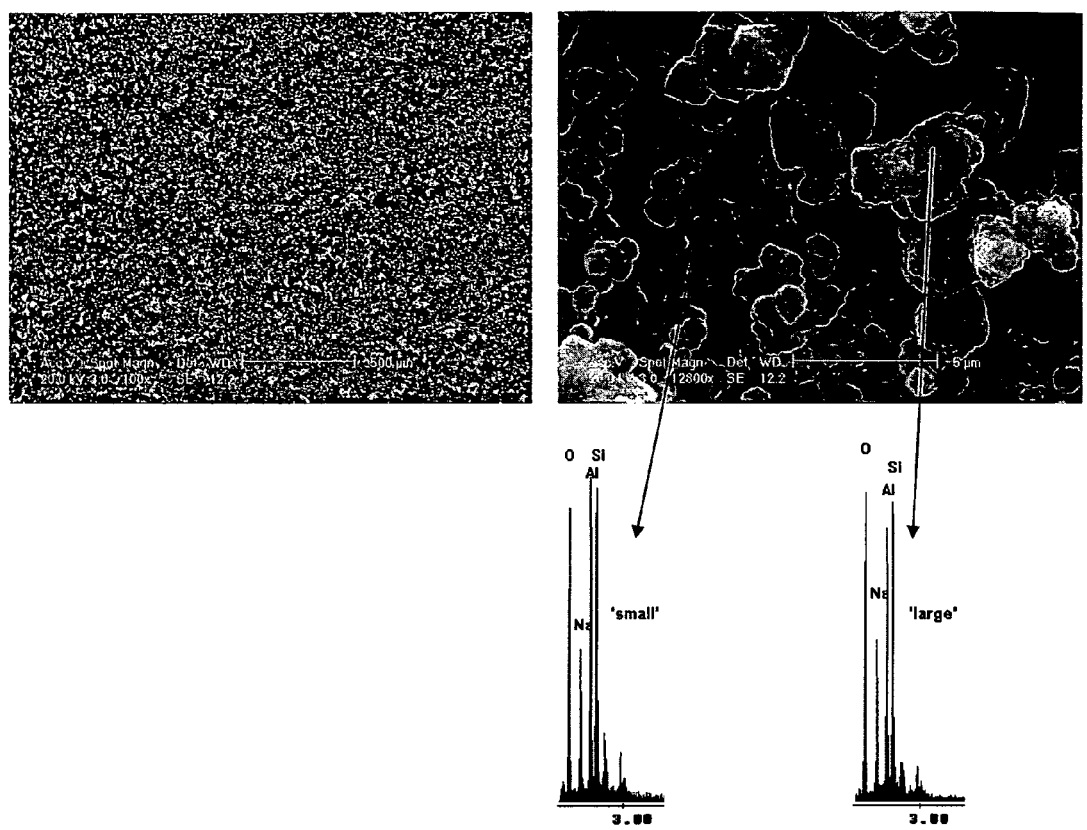
FIG. 14 shows a combined surface SEM micrographs and EDaX patterns for the top layer.
Figure 15:
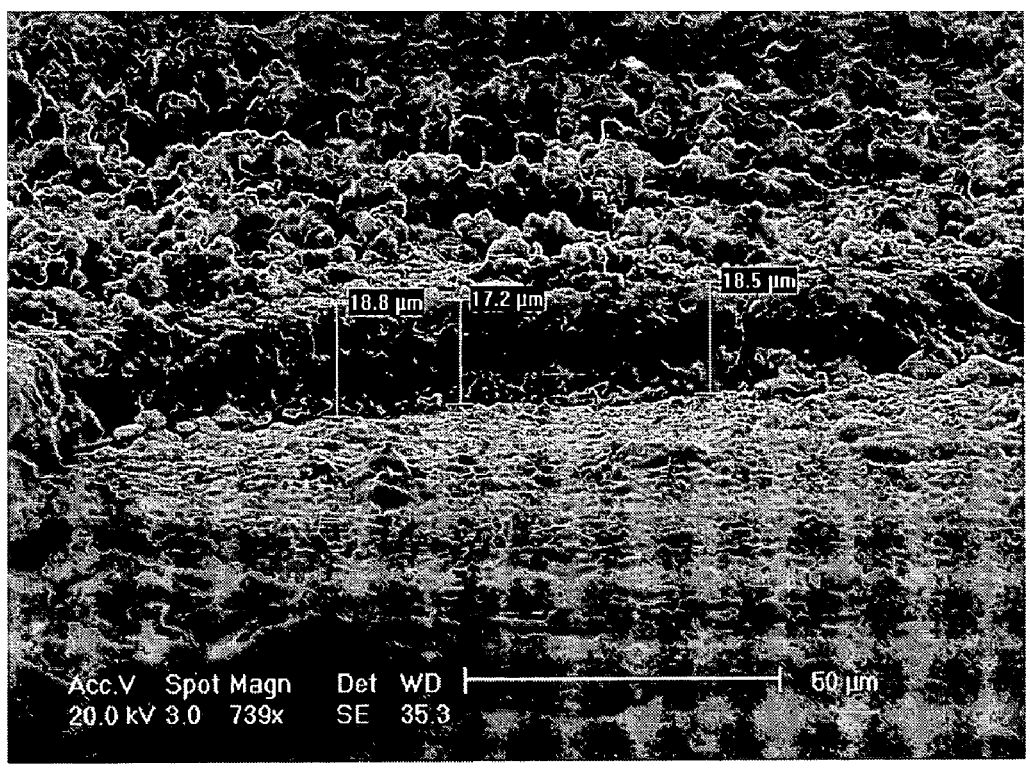
FIG. 15 is a SEM micrograph showing thicknesses of zeolite Y top layer and mixed zeolite (zeolite Y and ZSM-5) middle layer after HF etching

FIG. 14 shows combined surface SEM micrographs and EDaX patterns for the top layer. The near unity Si/Al ratio and strong Na signal from the EDaX pattern indicates the successful formation of a high-aluminum zeolite surface coating. FIG. 15 is a SEM micrograph showing thickness of ZY top layer and mixed zeolite (ZY and ZSM-5) middle layer after HF etching. A cross-sectional image of the three layers en total by HF etching was not performed because ZSM-5 is more chemically resistant than ZY and the contact time that the ZSM-5 base layer would need with HF would severely damage the other two layers containing high aluminum, ZY, zeolite.

Figure 16:
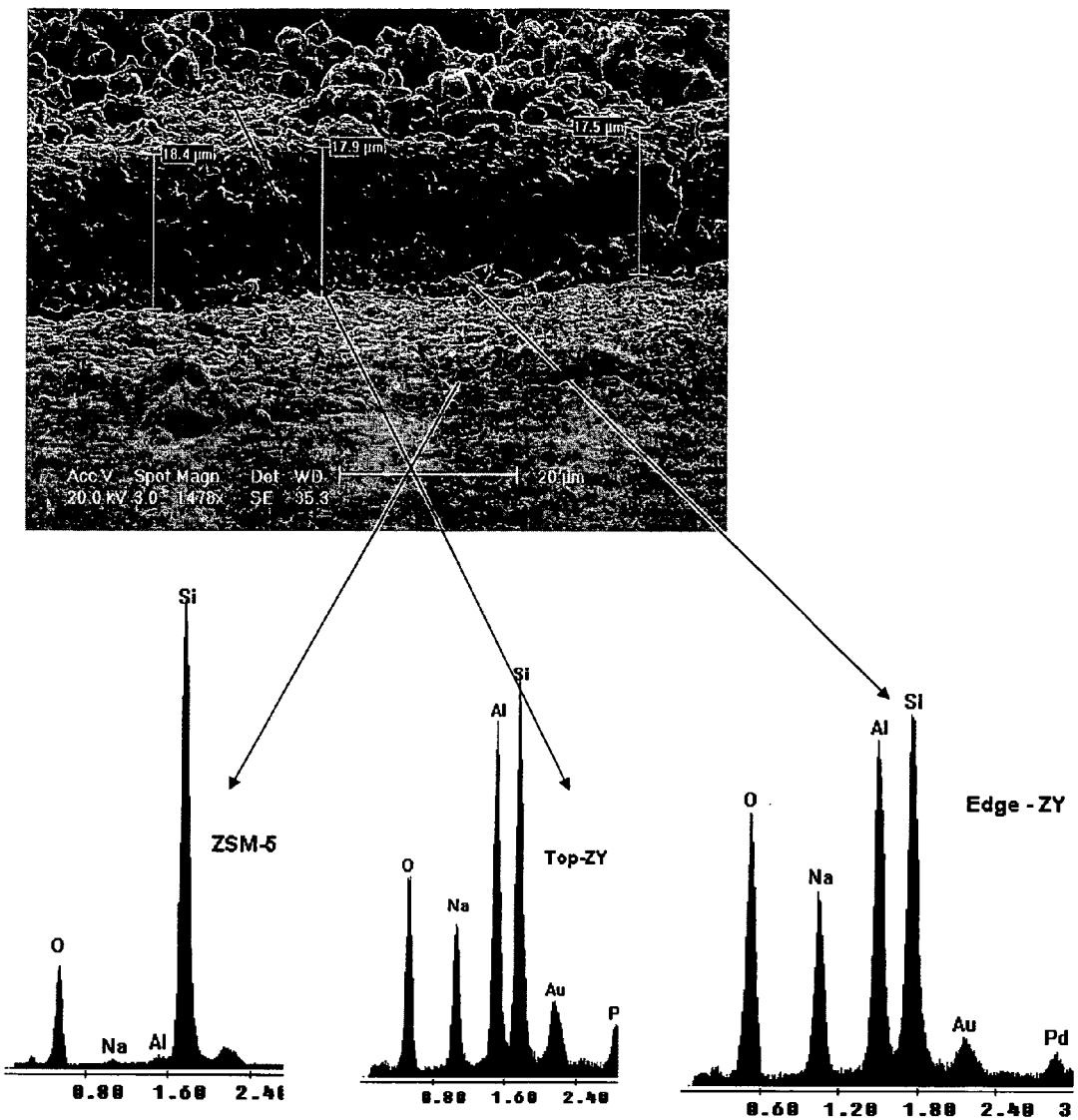
FIG. 16 shows SEM micrograph showing thicknesses of zeolite Y top layer and mixed zeolite (zeolite Y and ZSM-5) middle layer after HF etching and EDaX patterns of ZSM-5 base layer and zeolite Y top layer.

FIG. 16 is a SEM micrograph showing thickness of ZY top layer and mixed zeolite, ZY and ZSM-5, middle layer after HF etching. FIG. 16 also shows EDaX patterns of the ZSM-5 base layer and the ZY top layer. This figure shows the successful synthesis of a high aluminum zeolite coating on a ZSM-5 base layer.

As will be understood by those skilled in the art, other equivalent or alternative methods for the formation and applying a hydrophilic coating to the surface of a metal that is susceptible to corrosion, according to the embodiments of the present invention can be envisioned without departing from the essential characteristics thereof. For example, any pure or high silica zeolite may be used for the base layer in contact with the metal surface, so long as it provides for corrosion resistance. In addition, the high aluminum zeolite coating can be either a zeolite Y or alternately zeolite X and many others. Accordingly, the foregoing disclosure is intended to be illustrative, but not limiting, of the scope of the invention which is set forth in the following claims.

What is claimed is:

1. A composition of matter, comprising:
   a substrate of a metal that is susceptible to corrosion in a high pH alkaline solution;
   a corrosion-resistant base layer disposed on the surface of said substrate, said base layer comprising a pure or high silica zeolite having a silicon:aluminum atomic ratio of at least about 100;
   a middle mixed zeolite layer disposed on the surface of said base layer; and
   a top hydrophilic layer disposed on the surface of said middle layer, said top layer comprising a high aluminum zeolite having a silicon:aluminum atomic ratio of less than 5,
   wherein said middle mixed zeolite layer comprises a zeolite having a silicon:aluminum atomic ratio range that is between the silicon:aluminum ratio of the pure or high silica zeolite of said base layer and of the high aluminum zeolite of the said top layer.

2. The composition of matter of claim 1 wherein said middle layer is formed by a seeded growth process using a mixture of high silica and high aluminum zeolite crystals.

3. The composition of matter of claim 1 wherein said middle layer is formed by a seeded growth process using high aluminum zeolite seed crystals.

4. The composition of matter of claim 1 wherein said substrate comprises an aluminum substrate.

5. The composition of matter of claim 1 wherein said substrate comprises an aluminum alloy.

6. The composition of matter of claim 1 wherein said base corrosion-resistant layer is formed by a one-step in-situ crystallization process.

7. The composition of matter of claim 1 wherein said middle mixed zeolite layer is formed by a seeded growth process using a mixture of seed layer types comprising high silica and high aluminum zeolite crystals, where the topmost seed layer comprises a mixture having at least about fifty percent high aluminum zeolite crystals by mass.

8. The composition of matter of claim 1 wherein said middle mixed zeolite layer is formed by a two step process, where in the first step said base corrosion resistant layer is covered with a mixture of high aluminum zeolite seed and high silica zeolite seed crystals and in the second step, the covered substrate undergoes a high silica zeolite synthesis.

9. The composition of matter of claim 1 wherein said middle mixed zeolite layer is formed by a two step process, where in the first step said base corrosion resistant layer is covered with high aluminum zeolite seeds crystals and in the second step, the covered substrate undergoes a high silica zeolite synthesis.

10. The composition of matter of claim 1 wherein said top hydrophilic layer is formed by a process selected from the group consisting of seeded growth, in-situ crystallization, and a process including the addition of high-aluminum zeolite seed crystals to the high aluminum synthesis solution.

11. A composition of matter, comprising:
    a substrate of a metal that is susceptible to corrosion in a high pH alkaline solution, wherein said substrate comprises an aluminum substrate;

a corrosion-resistant base layer disposed on the surface of said substrate, said base layer comprising a pure or high silica zeolite having a silicon:aluminum atomic ratio of at least about 100;

a middle mixed zeolite layer disposed on the surface of said base layer, wherein said middle layer is formed by a seeded growth process using a mixture of high silica and high aluminum zeolite crystals; and a top hydrophilic layer disposed on the surface of said middle layer, said top layer comprising a high aluminum zeolite having a silicon:aluminum atomic ratio of less than 5, wherein said middle mixed zeolite layer comprises a zeolite having a silicon:aluminum atomic ratio range that is between the silicon:aluminum ratio of the pure or high silica zeolite of said base layer and of the high aluminum zeolite of the said top layer.

12. A composition of matter, comprising:

a substrate of a metal that is susceptible to corrosion in a high pH alkaline solution, wherein said substrate comprises an aluminum alloy;

a corrosion-resistant base layer disposed on the surface of said substrate, said base layer comprising a pure or high silica zeolite having a silicon:aluminum atomic ratio of at least about 100;

a middle mixed zeolite layer disposed on the surface of said base layer, wherein said middle layer is formed by a seeded growth process using a mixture of high silica and high aluminum zeolite crystals; and a top hydrophilic layer disposed on the surface of said middle layer, said top layer comprising a high aluminum zeolite having a silicon:aluminum atomic ratio of less than 5, wherein said middle mixed zeolite layer comprises a zeolite having a silicon:aluminum atomic ratio range that is between the silicon:aluminum ratio of the pure or high silica zeolite of said base layer and of the high aluminum zeolite of the said top layer.

13. A process for applying a corrosion-resistant and a hydrophilic coating to the surface of a metal substrate that is susceptible to corrosion in a high pH alkaline solution, comprising:

forming a base corrosion-resistant layer on the surface of said substrate, the base layer comprising a pure or high silica zeolite having a silicon:aluminum atomic ratio of at least about 100;

forming a middle mixed zeolite layer on the surface of the base layer; and forming a top hydrophilic layer on the surface of the middle layer, the top layer comprising a high aluminum zeolite having a silicon:aluminum atomic ratio of less than 5, wherein the middle mixed zeolite layer comprises a zeolite having a silicon:aluminum atomic ratio range that is between the silicon:aluminum ratio of the pure or high silica zeolite of the base layer and of the high aluminum zeolite of the top layer.

14. The process of claim 13 wherein the middle layer is formed by a seeded growth process using a mixture of high silica and high aluminum zeolite crystals.

15. The process of claim 13 wherein the middle layer is formed by a seeded growth process using high aluminum zeolite crystals.

16. The process of claim 13 wherein the base corrosion-resistant layer is formed by a one-step in-situ crystallization process.

17. The process of claim 13 wherein the middle mixed zeolite layer is formed by a seeded growth process using a mixture of seed types comprising high silica and high aluminum zeolite crystals.

18. The process of claim 17 wherein the mixture of seed types are applied in layers and where the top-most seed layer comprises a mixture having at least about fifty percent high aluminum zeolite crystals by mass.

19. The process of claim 13 wherein the middle mixed zeolite layer is formed by a two step process, where in the first step the first corrosion-resistant layer is covered with a high aluminum zeolite seed and high silica zeolite seed mixture and in the second step, the covered substrate undergoes a high silica zeolite synthesis.

20. The process of claim 13 wherein the middle mixed zeolite layer is formed by a two step process, where in the first step the base corrosion-resistant layer is covered with high aluminum zeolite seed crystals and in the second step, the covered substrate undergoes a high silica zeolite synthesis.

21. The process of claim 13 wherein the top hydrophilic layer is formed by a process selected from the group consisting of seeded growth, in-situ crystallization, and a process including the addition of high-aluminum seed crystals to the high aluminum synthesis solution.

* * * * *